US012700157B2

(12) United States Patent
Zhao et al.

(10) Patent No.: US 12,700,157 B2
(45) Date of Patent: Aug. 4, 2026

(54) EDITING DIGITAL IMAGES BASED ON MASKS

(71) Applicant: Adobe Inc., San Jose, CA (US)

(72) Inventors: Handong Zhao, Cupertino, CA (US); Zijun Wei, San Jose, CA (US); Trung Huu Bui, San Jose, CA (US); Jing Shi, San Jose, CA (US); Chongyang Gao, Evanston, IL (US)

(73) Assignee: Adobe Inc., San Jose, CA (US)

( * ) Notice: Subject to any disclaimer, the term of this patent is extended or adjusted under 35 U.S.C. 154(b) by 116 days.

(21) Appl. No.: 18/745,325

(22) Filed: Jun. 17, 2024

(65) Prior Publication Data

US 2025/0384601 A1    Dec. 18, 2025

(51) Int. Cl.
*G06T 11/60*        (2026.01)
*G06T 11/10*        (2026.01)
(52) U.S. Cl.
CPC .............. *G06T 11/60* (2013.01); *G06T 11/10* (2026.01); *G06T 2200/24* (2013.01)
(58) Field of Classification Search
CPC .... G06T 11/60; G06T 11/001; G06T 2200/24
See application file for complete search history.

(56) References Cited

U.S. PATENT DOCUMENTS 11,727,618 B1 *   8/2023  Parthasarathy ......... G10L 15/26
                                              345/473
2025/0078353 A1 *  3/2025  Ramesh ............... G06V 10/945

FOREIGN PATENT DOCUMENTS

CN         120852157  A  * 10/2025

OTHER PUBLICATIONS

Niu, Li, et al. "Making images real again: A comprehensive survey on deep image composition." arXiv preprint arXiv:2106.14490 (2021). (Year: 2021).*
Amir, Shir , et al., "Deep ViT Features as Dense Visual Descriptors", Cornell University, arXiv,org preprint [retrieved from the internet Aug. 7, 2024], <https://arxiv.org/pdf/2112.05814>, 2022, 17 pages.

(Continued)

*Primary Examiner* — Daniel F Hajnik
*Assistant Examiner* — Joshua Jungwook Suo
(74) *Attorney, Agent, or Firm* — FIG. 1 Patents

(57)                ABSTRACT

In implementation of techniques for editing digital images based on masks, a computing device implements an image combination system to receive a first digital image, a second digital image, a prompt describing an edit to the first digital image, and a mask identifying a portion of the second digital image. Using a machine learning model, the image combination system determines a feature of the portion of the second digital image identified by the mask to incorporate into content of the first digital image based on the prompt. The image combination system generates an edited digital image based on the edit described by the prompt, including the feature of the portion of the second digital image incorporated into the content of the first digital image. The image combination system then presents the edited digital image in a user interface.

20 Claims, 10 Drawing Sheets

(56) References Cited

OTHER PUBLICATIONS

Avrahami, Omri , et al., "Blended Diffusion for Text-driven Editing of Natural Images", 2022 IEEE/CVF Conference on Computer Vision and Pattern Recognition (CVPR) [retrieved Jan. 18, 2024]. Retrieved from the Internet <https://doi.org/10.1109/CVPR52688.2022.01767>, Jun. 2022, 11 pages.

Brooks, Tim , et al., "Learning to Synthesize Motion Blur", Cornell University arXiv, arXiv.org [retrieved Feb. 21, 2022]. Retrieved from the Internet <https://arxiv.org/pdf/1811.11745.pdf>., Jun. 20, 2019, 14 Pages.

Cao, Mingdeng , et al., "Masactrl: Tuning-free mutual self-attention control for consistent image synthesis and editing", Cornell University, arXiv.org, [retrieved from the internet on Sep. 17, 2024] <https://arxiv.org/pdf/2304.08465>, Apr. 17, 2023, 13 pages.

Cresswell, Antonia , et al., "Generative adversarial networks: An overview", IEEE signal processing magazine, 35(1), 2018, pp. 53-65.

Goel, Vidit , et al., "Pair-diffusion: Object-level image editing with structure-and-appearance paired diffusion models", Computer Vision Foundation, [retrieved from the internet on Sep. 17, 2024] <https://openaccess.thecvf.com/content/CVPR2024/papers/Goel_PAIR_Diffusion_A_Comprehensive_Multimodal_Object-Level_Image_Editor_CVPR_2024_paper.pdf>, 2023, 10 pages.

He, Zhenliang , et al., "Attgan: Facial attribute editing by only changing what you want", Cornell University arXiv, arXiv.org [retrieved Aug. 9, 2023]. Retrieved from the Internet <https://arxiv.org/pdf/1711.10678.pdf>., Jul. 25, 2018, 16 Pages.

He, Kaiming , et al., "Deep Residual Learning for Image Recognition", Proceedings of the IEEE conference on computer vision and pattern recognition, 2016 [retrieved Feb. 18, 2022], Retrieved from the Internet: <https://openaccess.thecvf.com/content_cvpr_2016/papers/He_Deep_Residual_Learning_CVPR_2016_paper.pdf>., Jun. 2016, 12 pages.

Hertz, Amir , et al., "Prompt-to-Prompt Image Editing with Cross Attention Control", Cornell University, arXiv Preprint, arxiv.org, Aug. 2, 2022, 19 pages.

Jansson, Andreas , et al., "Singing voice separation with deep u-net convolutional networks", Proceedings of the 18th ISMIR Conference, Suzhou, China, [retrieved from the internet on Sep. 17, 2024] <https://openaccess.city.ac.uk/id/eprint/19289/1/7bb8d1600fba70dd79408775cd0c37a4ff62.pdf>, Oct. 23, 2017, 7 pages.

Kawar, Bahjat , et al., "Imagic: Text-Based Real Image Editing with Diffusion Models", Cornell University, arXiv,org preprint [retrieved from the internet Aug. 7, 2024], <https://arxiv.org/pdf/2210.09276>, 2023, 16 pages.

Kingma, Diederik P, et al., "Auto-Encoding Variational Bayes", Cornell University arXiv, arXiv.org [retrieved Aug. 9, 2023]. Retrieved from the Internet <https://arxiv.org/pdf/1312.6114.pdf>., May 1, 2014, 14 Pages.

Mokady, Ron , et al., "Null-text inversion for editing real images using guided diffusion models", Cornell University, arXiv.org, [retrieved from the internet on Sep. 17, 2024] <https://arxiv.org/pdf/2211.09794>, Nov. 17, 2022, 20 pages.

Mou, Chong , et al., "T2i-adapter: Learning adapters to dig out more controllable ability for text-to-image diffusion models", Cornell University, arXiv.org, [retrieved from the internet on Sep. 17, 2024] <https://arxiv.org/pdf/2302.08453>, Mar. 20, 2023, 10 pages.

Park, Dong Huk, et al., "Shape-guided diffusion with inside-outside attention", Cornell University, arXiv.org, [retrieved from the internet on Sep. 17, 2024] <https://arxiv.org/pdf/2212.00210>, Apr. 1, 2024, 20 pages.

Perarnau, Guim , et al., "Invertible Conditional GANs for image editing", Cornell University arXiv, arXiv.org [retrieved Jan. 25, 2022]. Retrieved from the Internet <https://arxiv.org/pdf/1611.06355.pdf>., Nov. 19, 2016, 9 pages.

Radford, Alec , et al., "Learning Transferable Visual Models From Natural Language Supervision", Cornell University arXiv, arXiv.org [retrieved Jun. 29, 2023]. Retrieved from the Internet <https://arxiv.org/pdf/2103.00020.pdf>., Feb. 26, 2021, 48 Pages.

Ramesh, Aditya , et al., "Zero-Shot Text-to-Image Generation", Cornell University arXiv, arXiv.org [retrieved Feb. 21, 2023]. Retrieved from the Internet <https://arxiv.org/pdf/2102.12092.pdf>., Feb. 26, 2021, 20 Pages.

Rombach, Robin , et al., "High-resolution image synthesis with latent diffusion model", In Proceedings of the IEEE/CVF Conference on Computer Vision and Pattern Recognition, Apr. 13, 2022, pp. 10684-10695.

Saharia, Chitwan , et al., "Photorealistic Text-to-Image Diffusion Models with Deep Language Understanding", Cornell University arXiv, arXiv.org [retrieved Aug. 11, 2023]. Retrieved from the Internet <https://arxiv.org/pdf/2205.11487.pdf>., May 23, 2022, 46 Pages.

Shen, Yujun , et al., "Interpreting the Latent Space of GANs for Semantic Face Editing", Cornell University arXiv, arXiv.org [retrieved Aug. 9, 2023]. Retrieved from the Internet <https://arxiv.org/pdf/1907.10786.pdf>., Nov. 26, 2019, 20 pages.

Song, et al., "Denoising Diffusion Implicit Models", Cornell University, arXiv.org, arXiv:2010.02502 [cs.LG], retrieved from the internet on May 20, 2024, <https://arxiv.org/abs/2010.02502>, Oct. 5, 2022, 22 pages.

Song, Yang, et al., "Generative modeling by estimating gradients of the data distribution", Cornell University, arXiv.org, [retrieved from the internet on Sep. 17, 2024] <https://arxiv.org/pdf/1907.05600>, Oct. 10, 2020, 23 pages.

Vaswani, Ashish , et al., "Attention Is All You Need", Cornell University arXiv Preprint, arXiv.org [retrieved Aug. 9, 2023]. Retrieved from the Internet <https://arxiv.org/pdf/1706.03762.pdf>., Dec. 6, 2017, 15 pages.

Wang, Tengfei , et al., "High-fidelity gan inversion for image attribute editing", Cornell University, arXiv.org, [retrieved from the internet on Sep. 17, 2024] <https://arxiv.org/abs/2109.06590>, Mar. 17, 2022, 10 pages.

Wu, Qiucheng, et al., "Uncovering the disentanglement capability in text-to-image diffusion models", Cornell University, arXiv.org, [retrieved from the internet on Sep. 17, 2024] <https://arxiv.org/pdf/2212.08698>, Dec. 16, 2022, 23 pages.

Yeh, Raymond , et al., "Semantic facial expression editing using autoencoded flow", Cornell University, arXiv.org, [retrieved from the internet on Sep. 17, 2024] <https://arxiv.org/pdf/1611.09961>, Nov. 30, 2016, 10 pages.

Yu , et al., "Scaling Autoregressive Models for Content-Rich Text-to-Image Generation", Cornell University, arXiv.org, arXiv:2206.10789 [cs.CV], retrieved from the internet on May 20, 2024, <https://arxiv.org/abs/2206.10789>, Jun. 22, 2022, 49 pages.

Zhang, Lymin , et al., "Adding conditional control to text-to-image diffusion models", Cornell University, arXiv.org, [retrieved from the internet on Sep. 17, 2024] <https://arxiv.org/pdf/2302.05543>, Nov. 26, 2023, 12 pages.

Zhang, Yuxin , et al., "ProSpect: Prompt Spectrum for Attribute-Aware Personalization of Diffusion Models", Cornell University, arXiv.org, [retrieved from the internet on Sep. 17, 2024] <https://arxiv.org/pdf/2305.16225>, Dec. 7, 2023, 15 pages.

* cited by examiner

Figure 1:
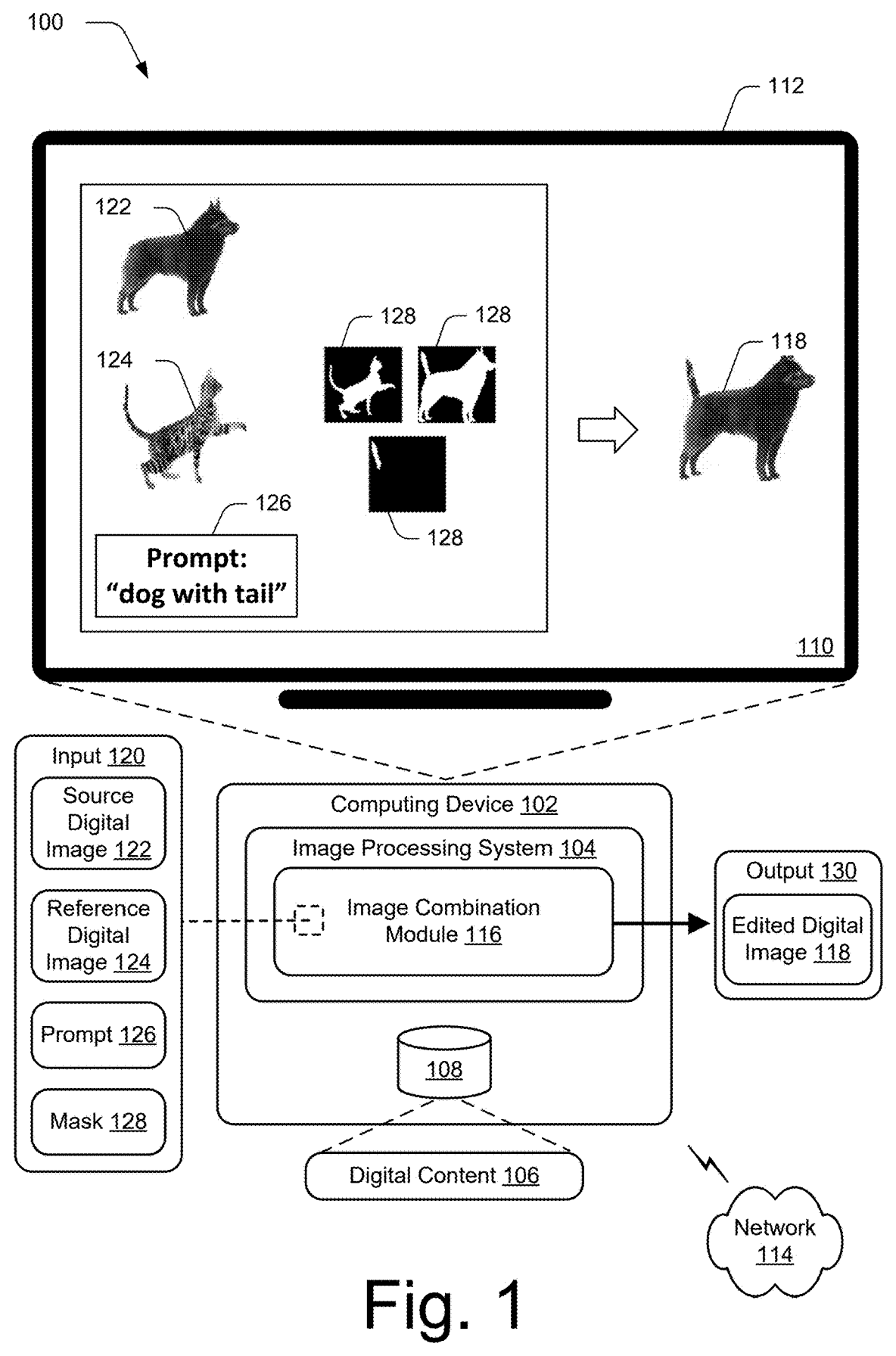

100

112

122

128    128

124

118

126

**Prompt:
"dog with tail"**

128

110

Input 120

Source
Digital
Image 122

Reference
Digital
Image 124

Prompt 126

Mask 128

Computing Device 102

Image Processing System 104

Image Combination
Module 116

Output 130

Edited Digital
Image 118

108

Digital Content 106

Network
114

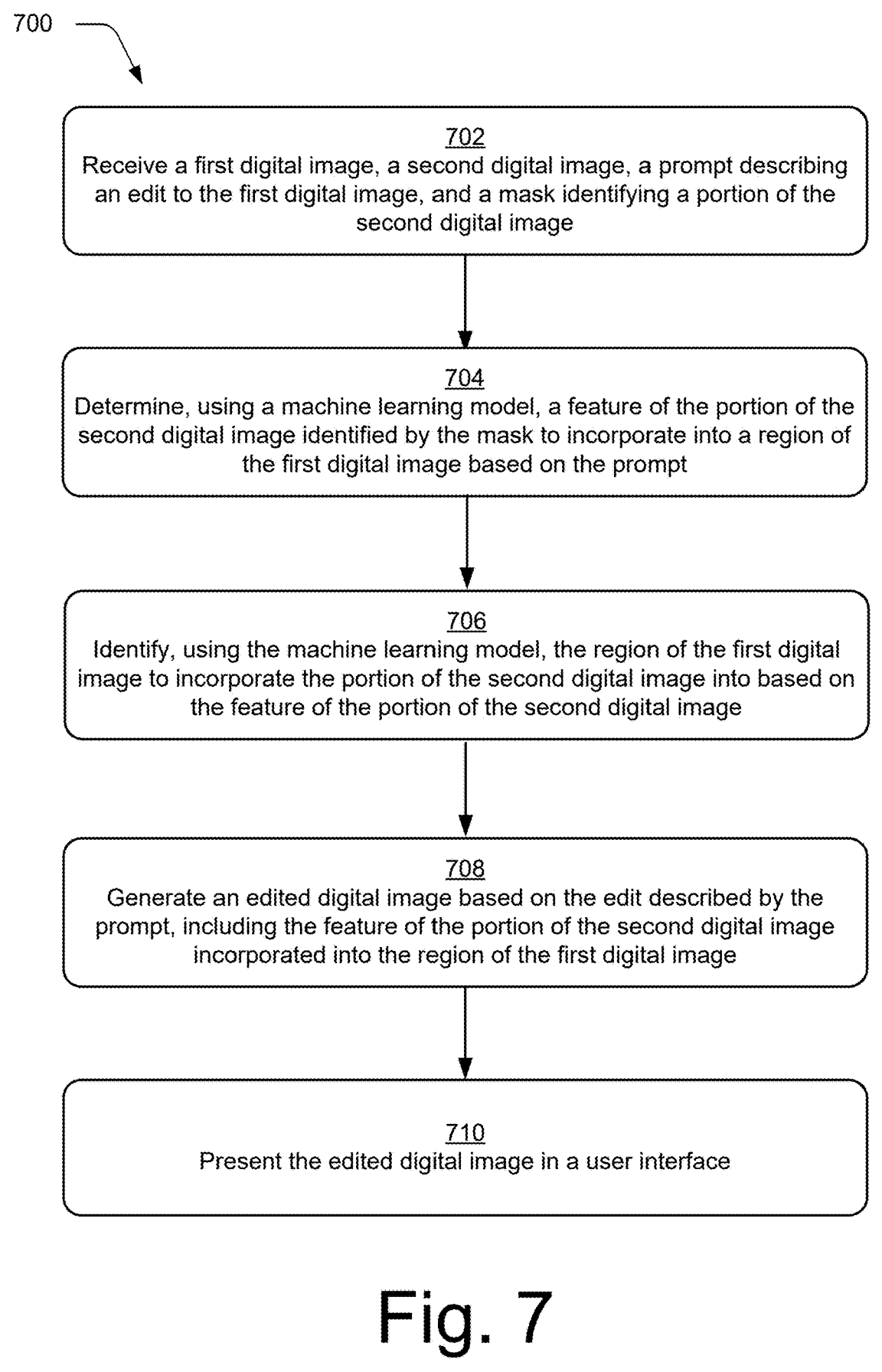

702
Receive a first digital image, a second digital image, a prompt describing an edit to the first digital image, and a mask identifying a portion of the second digital image

↓

704
Determine, using a machine learning model, a feature of the portion of the second digital image identified by the mask to incorporate into a region of the first digital image based on the prompt

↓

706
Identify, using the machine learning model, the region of the first digital image to incorporate the portion of the second digital image into based on the feature of the portion of the second digital image

↓

708
Generate an edited digital image based on the edit described by the prompt, including the feature of the portion of the second digital image incorporated into the region of the first digital image

↓

710
Present the edited digital image in a user interface

Fig. 7

800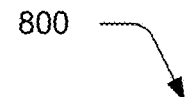

```
┌─────────────────────────────────────────────────────────┐
│                           802                            │
│   Receive a first digital image, a second digital image, │
│   and a mask identifying a portion of the second digital │
│                          image                           │
└─────────────────────────────────────────────────────────┘
                             │
                             ▼
┌─────────────────────────────────────────────────────────┐
│                           804                            │
│  Determine, using a machine learning model, a feature of │
│  the portion of the second digital image to incorporate  │
│  into a region of the first digital image based on the   │
│                          mask                            │
└─────────────────────────────────────────────────────────┘
                             │
                             ▼
┌─────────────────────────────────────────────────────────┐
│                           806                            │
│   Identify, using the machine learning model, the region │
│   of the first digital image to incorporate the portion  │
│   of the second digital image into based on the feature  │
│         of the portion of the second digital image       │
└─────────────────────────────────────────────────────────┘
                             │
                             ▼
┌─────────────────────────────────────────────────────────┐
│                           808                            │
│   Generate an edited digital image by incorporating the  │
│   feature of the portion of the second digital image into│
│           the region of the first digital image          │
└─────────────────────────────────────────────────────────┘
                             │
                             ▼
┌─────────────────────────────────────────────────────────┐
│                           810                            │
│        Present the edited digital image in a user        │
│                        interface                         │
└─────────────────────────────────────────────────────────┘
```

Fig. 8

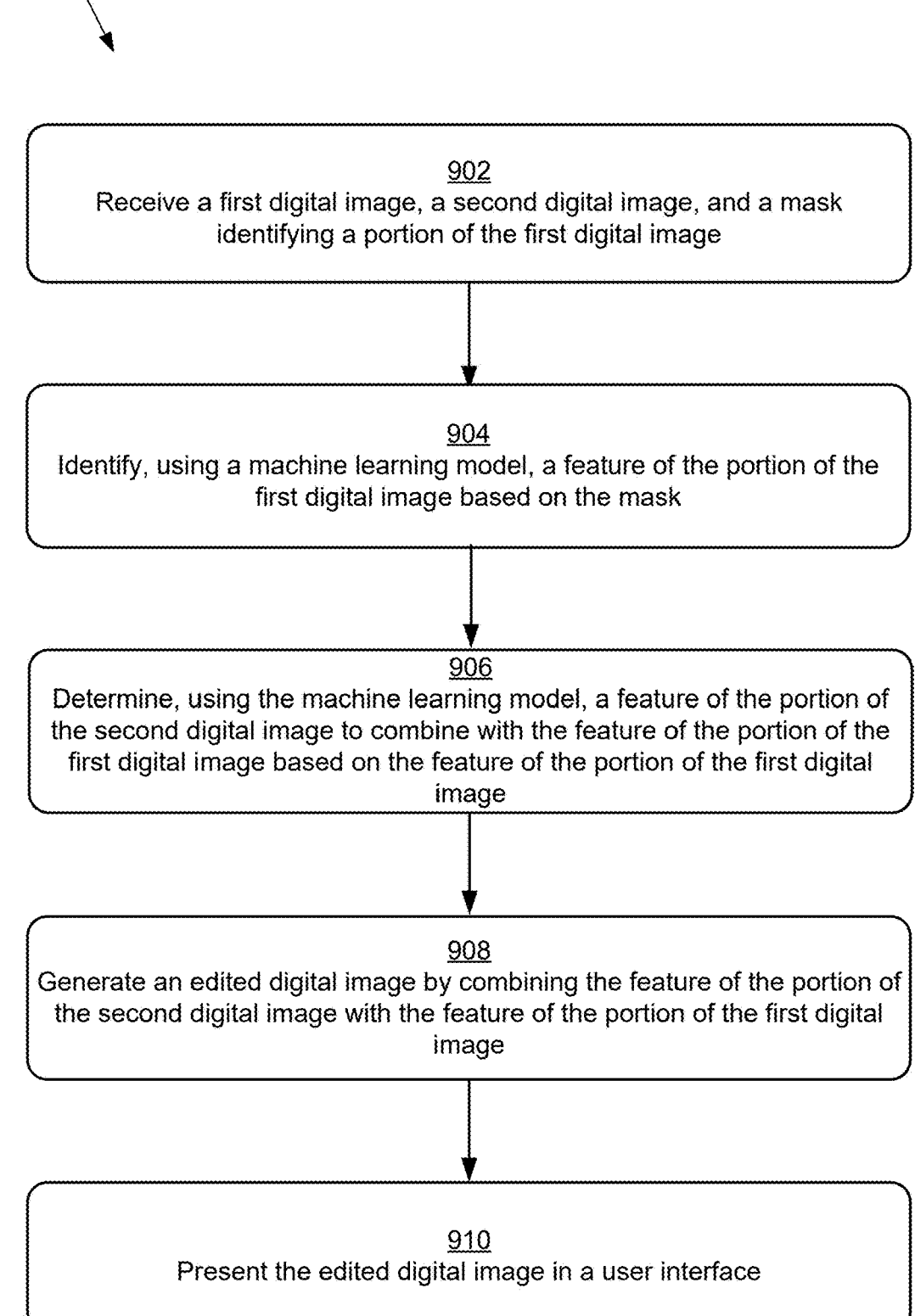

900

902
Receive a first digital image, a second digital image, and a mask identifying a portion of the first digital image

904
Identify, using a machine learning model, a feature of the portion of the first digital image based on the mask

906
Determine, using the machine learning model, a feature of the portion of the second digital image to combine with the feature of the portion of the first digital image based on the feature of the portion of the first digital image

908
Generate an edited digital image by combining the feature of the portion of the second digital image with the feature of the portion of the first digital image

910
Present the edited digital image in a user interface

EDITING DIGITAL IMAGES BASED ON MASKS

BACKGROUND

Digital images have a variety of applications in graphic design, video production, advertising, entertainment, and other fields. Because digital images are collectively formed by pixels that contain color and brightness information for a single point, digital images are edited by changing or rearranging the pixels to form a new digital image. Examples of typical edits, for instance, include adjusting color, cropping, resizing, and incorporating additional visual content into a digital image. However, techniques for editing digital images result in visual inaccuracies, computational inefficiencies, and increased power consumption in real world scenarios.

SUMMARY

Techniques and systems for editing digital images based on masks are described. In an example, an image combination system receives a first digital image, a second digital image, a prompt describing an edit to the first digital image, and a mask identifying a portion of the second digital image. The prompt describes a visual feature of an object depicted in the edited digital image.

Using a machine learning model, the image combination system determines a feature of the portion of the second digital image identified by the mask to incorporate into a region of the first digital image based on the prompt. Additionally, using the machine learning model, the image combination system identifies the region of the first digital image to incorporate the portion of the second digital image into based on the feature of the portion of the second digital image. The feature of the portion of the second digital image is a texture or a shape depicted in the second digital image. In some examples, the machine learning model is a diffusion model that applies attentions to vectors describing features of the first digital image and the second digital image.

The image combination system generates an edited digital image based on the edit described by the prompt, including the feature of the portion of the second digital image incorporated into the region of the first digital image. Some examples further comprise receiving an additional digital image and determining the feature of the portion of the second digital image or the additional digital image to incorporate into the first digital image based on the attentions applied by the diffusion model. The image combination system then presents the edited digital image in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 1 is an illustration of a digital medium environment in an example implementation that is operable to employ techniques and systems for editing digital images based on masks as described herein.

FIG. 7 depicts a procedure in an example implementation of editing digital images based on masks.

FIG. 8 depicts a procedure in an additional example implementation of editing digital images based on masks.

FIG. 9 depicts a procedure in an additional example implementation of editing digital images based on masks.

DETAILED DESCRIPTION

Overview

Figure 2:
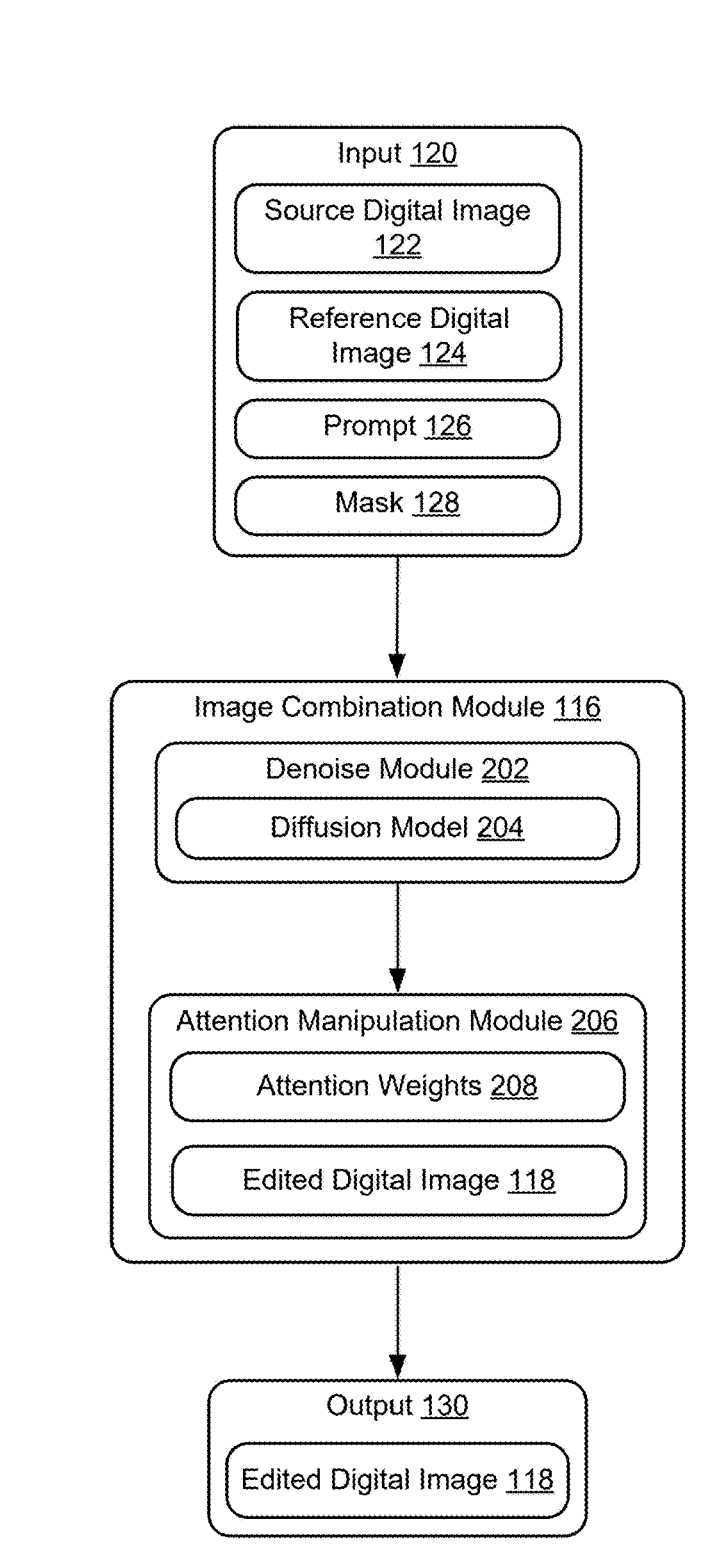
FIG. 2 depicts a system in an example implementation showing operation of an image combination module for editing digital images based on masks.

Digital images are composed of collections of pixels that represent single colors or levels of brightness and together depict digital content displayed in a user interface. Typical operations to edit digital images involve generating an edited digital image by combining content depicted in two different digital images. Conventional digital image editing techniques use generative machine learning models and text command inputs to combine portions of digital images. For instance, a machine learning model is trained to identify a portion of a digital image targeted by specific keywords. The machine learning model isolates pixels belonging to the portion of the digital image from surrounding content and incorporates the pixels into an additional digital image, which also involves training the machine learning model to identify where to position the pixels in the additional digital image.

However, these conventional digital image editing techniques involve extensive training on text-based commands for the machine learning models to perform the edits, which is time-consuming and resource-intensive. This is because the text-based commands involve a high variability of word choice, and the machine learning models are trained using a large amount of training data to learn to evaluate different text-based commands that have subtle differences in meaning or differences from user to user. Moreover, these conventional digital image editing techniques produce inaccurate outputs when receiving imprecise text command inputs. In an example involving editing a digital image of an animal, a user has difficulty describing specific portions of the animal that the user desires to edit, or identifying specific types of texture from another digital image that the user desires to incorporate into the digital image of the animal.

Techniques and systems are described for editing digital images based on masks that overcome these limitations. An image combination system begins in this example by receiving a source digital image, a reference digital image, a mask, and a prompt. An edited digital image, for instance, is desired that incorporates a feature of the reference digital image, including a texture or a shape, into the source digital image. The prompt is a description of the edited digital image, and the mask identifies either a region of the source digital image to receive the feature from the reference digital image or a portion of the reference digital image to extract the feature for transfer to the source digital image. The mask is based on an input received as an outline drawn via a user interface.

The image combination system uses a diffusion model to remove noise from the input to derive insights from the source digital image and the reference digital image. To determine how to combine the source digital image and the reference digital image, the image combination system uses the diffusion model to determine attentions from the input that indicate which features of the reference digital image to incorporate into the source digital image to form the edited digital image, or which features of the source digital image to retain in the edited digital image. The diffusion model does this by replacing vectors indicating features of the source digital image and the reference digital image. For instance, the source digital image is associated with a first set of vectors that describe features of the source digital image, and the reference digital image is associated with a second set of vectors that describe features of the reference digital image. The diffusion model determines attentions for features of the edited digital image by replacing vectors associated with the source digital image and the reference digital image specified by the prompt and the mask.

In an example, the diffusion model determines that the edited digital image is to include content from the source digital image, with a texture of the reference digital image that replaces a texture of the source digital image, indicated by the input. The image combination system then replaces a vector associated with the texture of the source digital image with a vector associated with the texture of the reference digital image. In addition or alternatively, the image combination system replaces a vector associated with a shape of the source digital image with a vector associated with a shape of the reference digital image, based on the input.

The image combination system then generates an output including the edited digital image for presentation in the user interface. The edited digital image includes features of the source digital image and the reference digital image that are combined based on the attentions determined by the diffusion model. For example, the image combination system receives a source digital image depicting a dog and a reference digital image depicting a cat. The image combination system also receives a prompt "dog with cat's tail" and a mask drawn over the cat's tail. Based on the prompt and the mask, a diffusion model identifies the tail of the cat for incorporation of a shape and a texture of the tail onto the dog.

Editing digital images based on masks in this manner overcomes the disadvantages of conventional editing techniques that are limited to training a machine learning model to identify portions of digital images to combine based on text commands. For example, receiving a mask as input guides the diffusion model to output an accurately edited digital input. For instance, because the mask identifies a specific feature in the reference digital image to incorporate into the source digital image or a portion of the source digital image to receive the feature of the reference digital image, the diffusion model is not trained for specific text commands, allowing convenient customization of editing by drawing the mask. This is because the mask is a direct input that specifies a boundary of the specific feature of the digital image to incorporate into an additional digital image (e.g., a specific type of texture or a specific shape of the digital image), which does not involve training a machine learning model to identify the specific feature based on text commands.

This also results in accurately generated edited digital images in scenarios when a mask is easily drawn to identify a feature of a digital image that is not easily described using text commands. For example, a user has difficulty describing a specific region on a digital image of a cat to incorporate into a different digital image using text commands, but the user easily draws a mask over the specific feature. For these reasons, editing digital images based on masks in this manner is faster and less resource-intensive than conventional digital image editing techniques.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for editing digital images based on masks described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes an image combination module 116 which is illustrated as incorporated by the image processing system 104 to process the digital content 106. In some examples, the image combination module 116 is separate from the image processing system 104 such as in an example in which the image combination module 116 is available via the network 114.

The image combination module 116 is configured to generate an edited digital image 118 that is a combination of portions of different images. For example, the image combination module 116 first receives an input 120 including a source digital image 122, a reference digital image 124, a prompt 126, and a mask 128.

The source digital image 122 is a digital image that a user desires to edit by incorporating a feature of the reference digital image 124 into the source digital image 122, resulting in the edited digital image 118. Features include a texture depicted in the reference digital image 124 or a shape of an object depicted in the reference digital image 124. In this example, the source digital image 122 is a dog with a dark fur texture but no tail, and the reference digital image 124 is a cat with a spotted texture and a tail.

The prompt 126 is a description of the edited digital image 118 and describes the features the user desires in the edited digital image 118. In this example, the prompt 126 is "dog with tail," indicating that the edited digital image 118 is a dog with a tail. The mask 128 guides generation of the edited digital image 118 by indicating a portion of the reference digital image 124 to incorporate a feature into the source digital image 122, or a target portion of the source digital image 122 to receive a feature from the reference digital image 124. The mask 128 is an object level mask, which identifies a feature of a whole object depicted in the source digital image 122 or the reference digital image 124, or a part level mask, which identifies a feature of a portion of the object depicted in the source digital image 122. In this example, the image combination module 116 receives three masks, including an object level mask for the cat indicating a texture of the whole cat, an object level mask for the dog indicating an addition of a tail to the shape of the dog, and a part level mask indicating a portion of the dog to receive the texture of the cat. Because the part level mask indicates the tail of the dog, the tail of the dog receives the texture of the cat. In some examples, the mask 128 is generated using a co-segmentation model that simultaneously segments multiple objects or regions of interest within source digital image 122 and the reference digital image 124.

After receiving the input 120, the image combination module 116 uses a diffusion model to initially denoise the source digital image 122 and the reference digital image 124. The image combination module 116 then predicts noise with attention manipulation based on the prompt 126 and the mask 128. For instance, the diffusion model employs attention manipulation to edit the shape of the dog to include the tail indicated in the object level mask of the dog and to include the texture of the cat on the tail of the dog. The diffusion model performs this by replacing vectors indicating features of the source digital image 122 and the reference digital image 124 to guide generation of the edited digital image 118, as explained in further detail with respect to FIG. 4. In some examples, this involves identifying a region of the source digital image 122 to incorporate the portion of the reference digital image 124 into based on the feature of the portion of the source digital image 122. For instance, the diffusion model determines which location in the source digital image 122 to position the tail on the dog based on features of the dog or a geometry of the dog. In some examples, the diffusion model compares the feature of the portion of the reference digital image 124 to features of the source digital image 122. To do this, the diffusion model is trained to identify a region of the source digital image 122 that corresponds to the portion of the reference digital image 124. In this example, based on training data depicting dogs or other animals, the diffusion model determines an appropriate location for the tail on the dog is at the rear of the dog. In other examples, the image combination module 116 receives a user input specifying the location in the source digital image 122 to position the tail using an additional mask or other location identifier.

The image combination module 116 then generates an output 130 for presentation in the user interface 110, including the edited digital image 118. The edited digital image 118, for instance, is a combination of different features of the source digital image 122 and the reference digital image 124, including the shape of the dog with the tail, the tail having texture of the cat depicted in the reference digital image 124. Generating the edited digital image 118 in this manner based on the prompt 126 and the mask 128 allows for a high level of customizability of the edited digital image 118 with using limited text-based commands and limited training of the diffusion model.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Editing Digital Images Based on Masks

FIG. 2 depicts a system 200 in an example implementation showing operation of the image combination module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-10.

To begin in this example, an image combination module 116 receives an input 120 including a source digital image 122 and a reference digital image 124. In some examples, the input 120 also includes a prompt 126, a mask 128, or both the prompt 126 and the mask 128. The prompt 126 and the mask 128 guide the image combination module 116 to generate the edited digital image 118. For instance, the prompt 126 is a description of visual features of the edited digital image 118, including features of the reference digital image 124 to incorporate into the edited digital image 118, or features of the source digital image 122 to retain in the edited digital image 118.

The mask 128 indicates specific features of the reference digital image 124 to incorporate into the source digital image 122 to form the edited digital image 118, or indicates portions of the source digital image 122 to receive a feature of the reference digital image 124 to form the edited digital image 118. The mask 128, for instance, is an outline on the source digital image 122 or reference digital image 124 that is drawn by a user to guide generation of the edited digital image 118 based on specific user preferences (e.g., the user may select the bow-tie of a cat). In some examples, the image combination module 116 leverages a co-segmentation model to automatically generate the mask 128. The co-segmentation model, for instance, isolates an individual object or objects in the source digital image 122 or the reference digital image 124 by comparing similarities or consistencies between content depicted in the source digital image 122 or the reference digital image 124. In some examples, the co-segmentation model identifies a salient object in the source digital image 122 or the reference digital image 124 to suggest an object for the mask 128 or the assist in completing drawing the mask 128.

The image combination module 116 includes a denoise module 202. The denoise module 202 uses a diffusion model 204 to remove noise from the input 120 to derive insights from the source digital image 122 and the reference digital image 124. For instance, the diffusion model 204 inverses the source digital image 122 or the reference digital image 124 and performs an initial denoise process to predict noise for the source digital image 122 and the reference digital image 124.

The image combination module 116 also includes an attention manipulation module 206. The attention manipulation module 206 determines attention weights 208 from the input 120 that indicate which features of the reference digital image 124 to incorporate into the source digital image 122 to form the edited digital image 118 and which features of the source digital image 122 to retain in the edited digital image 118. The attention manipulation module 206 does this by using the diffusion model 204 to replace vectors indicating features of the source digital image 122 and the reference digital image 124. For instance, the source digital image 122 is associated with a first set of vectors that describe features of the source digital image 122, and the reference digital image 124 is associated with a second set of vectors that describe features of the reference digital image 124. The attention manipulation module 206 determines the attention weights 208 that are associated with the features of the source digital image 122 and the reference digital image 124 by replacing vectors associated with the source digital image 122 and the reference digital image 124. In an example, because the diffusion model 204 determines that a texture of the reference digital image 124 replaces a texture of the source digital image 122 based on the input 120, the diffusion model 204 replaces a vector associated with the texture of the source digital image 122 with a vector associated with the texture of the reference digital image 124. In addition or alternatively, the attention manipulation module 206 replaces a vector associated with a shape of the source digital image 122 with a vector associated with a shape of the reference digital image 124.

The image combination module 116 then generates an output 130 including the edited digital image 118 for display. The edited digital image 118 includes features of the source digital image 122 and the reference digital image 124 based on a combination based on the attention weights 208 determined by the attention manipulation module 206. Because the image combination module 116 generates the edited digital image 118 based on the prompt 126 and/or the mask 128, the edited digital image 118 conforms to the desired combination of features from the source digital image 122 and the reference digital image 124.

FIGS. 3-10 depict stages of editing digital images based on masks. In some examples, the stages depicted in these figures are performed in a different order than described below.

Figure 3:
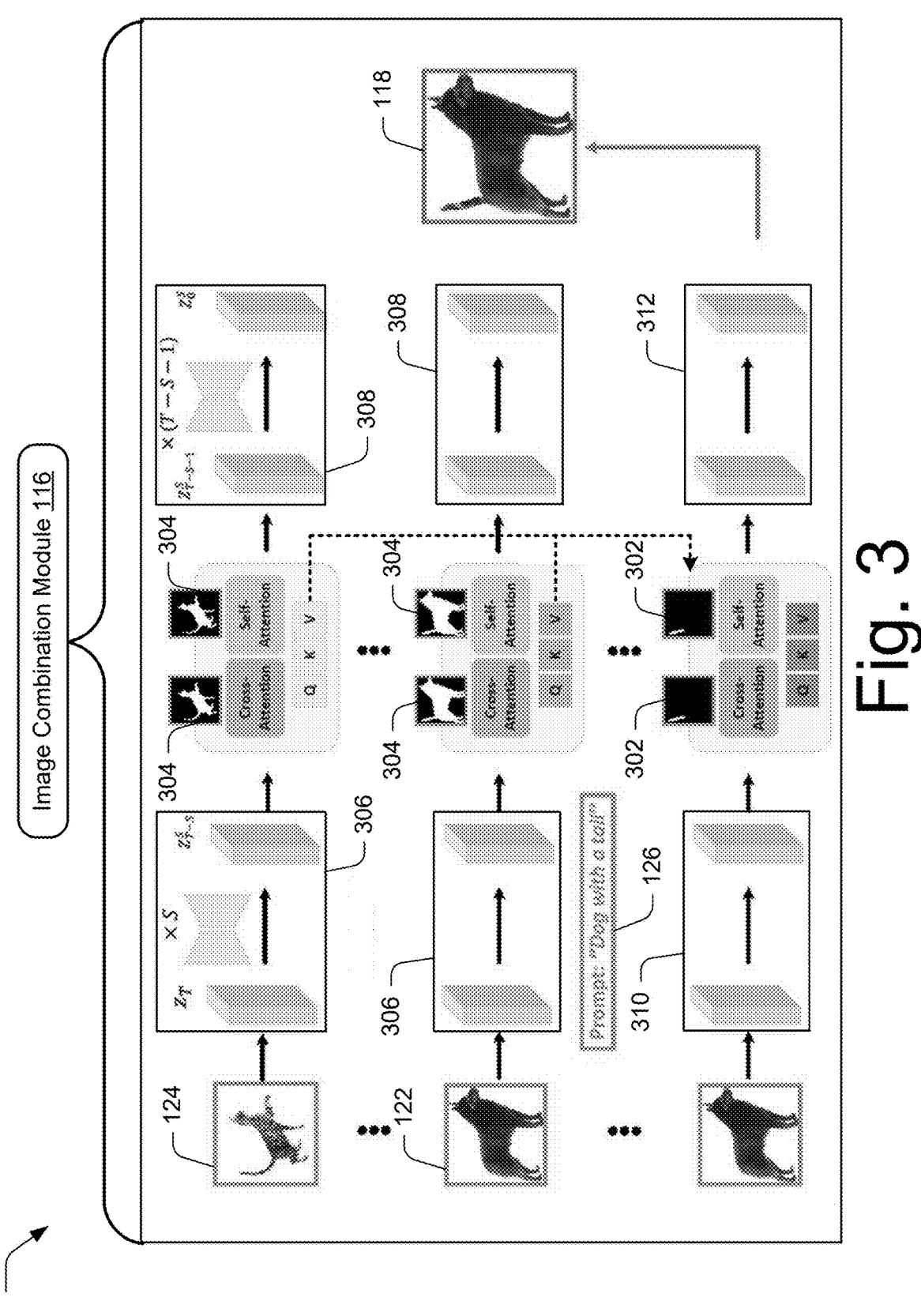
FIG. 3 depicts an example of an architecture of the image combination module.

FIG. 3 depicts an example 300 of an architecture of the image combination module. To begin, an image combination module 116 receives a source digital image 122 and a reference digital image 124. In this example, the source digital image 122 is an image of a dog that a user desires to edit, and the reference digital image 124 is an image of a cat having a feature that the user desires to incorporate into the source digital image 122. Specifically, the user desires an edited digital image 118 depicting the dog from the source digital image 122 that includes a tail with texture extracted from the reference digital image 124.

To guide generation of the edited digital image 118, the image combination module 116 also receives a prompt 126 and a series of masks. The prompt 126 describes a feature of the edited digital image 118, which is "Dog with tail" in this example. The series of masks also guide the generation of the edited digital image 118 by specifying a portion of the source digital image 122 to receive a texture, a portion of the reference digital image 124 to extract a texture, a portion of the source digital image 122 to add a shape, or a portion of the reference digital image 124 to extract a shape. Masks are part level masks 302 or object level masks 304. The part level masks 302 indicate a texture or a shape of an indicated part of a depicted object in the source digital image 122 or the reference digital image 124. The object level masks 304 indicate a texture or a shape of a whole object in the source digital image 122 or the reference digital image 124.

In this example, the image combination module 116 receives an object level mask 304 specifying a texture to extract from the reference digital image 124 and an object level mask 304 indicating a shape of the source digital image 122 with an addition of a tail. The object level masks 304 indicating the shape of the source digital image 122 depicting the dog with the addition of the tail, for instance, is drawn by a user to incorporate the tail shape onto the dog. The image combination module 116 also receives a part level mask 302 indicating the tail of the dog in the source digital image 122 to receive the texture from the cat of the reference digital image 124. This controls which portion of the source digital image 122 receives the texture from the reference digital image 124, so that the texture is not applied to the entire dog indicated by the part level mask 302. Because the part level mask 302 indicating the tail of the dog in the source digital image 122 is also drawn by a user in this example, the image combination module 116 is able to determine how to accurately incorporate the texture from the reference digital image 124 into the source digital image 122.

To generate the edited digital image 118 based on the source digital image 122, the reference digital image 124, the prompt 126, and the masks, the image combination module 116 leverages a diffusion model 204. The diffusion model 204 is a generative machine learning model that generates high-dimensional data by progressively improving a random noise signal until a desired data distribution is achieved. The diffusion model 204 includes an initial denoise phase 306 and a denoise with attention manipulation phase 308 the input signals, based on the source digital image 122, the reference digital image 124, the prompt 126, and the masks. The initial denoise phase 306 inverses the source digital image 122 and the reference digital image 124 into Gaussian noise $Z_T$, following Null-Texture inversion, which a technique used for editing real images using guided diffusion models. The denoise with attention manipulation phase 308 applies to the first S steps for the source digital image 122 and the reference digital image 124, followed by predicting the noise with attention manipulation for the source digital image 122 and the reference digital image 124. The diffusion model 204 then manipulates attention maps corresponding to the masks for self-attention and cross-attention.

The cross-attention of the diffusion model 204 considers relationships between two different sequences. The cross-attention of the diffusion model 204 has two input sequences, including an input sentence and a context sentence. The cross-attention computes the importance of each word or token in the input sentence with respect to the words or tokens in the context sentence, and vice-versa. Specifically, the cross-attention allows the diffusion model 204 to focus on different parts of the context sentence depending on the content of the input sentence.

The self-attention of the diffusion model 204 computes importances of each word or token in a sequence with respect to other words or tokens in the input sequence. The input sequence of the self-attention of the diffusion model 204 is transformed into three vectors: Query ("Q"), Key ("K"), and Value ("V") vectors, which are described in further detail with respect to FIG. 4. The diffusion model 204 uses these vectors to calculate attention scores, which determine how much each word corresponds to other words in the sequence. The self-attention of the diffusion model 204 is used within a single sequence and helps capture dependencies and relationships between words in that sequence, and it allows the model to weigh the relevance of each word or token to the others when processing the sequence.

Following the initial denoise phase 306 and the denoise with attention manipulation phase 308, the diffusion model 204 performs rediffusion in this example. The rediffusion includes a rediffusion denoise phase 310 and a rediffusion denoise with attention manipulation phase 312 to increase coherency of results. The rediffusion denoise phase 310 inverses the output from the denoise with attention manipulation phase 308, and the rediffusion denoise with attention manipulation phase 312 predicts noise with attention manipulation for the edited digital image 118. The diffusion model 204 therefore generates the edited digital image 118 based on the source digital image 122, the reference digital image 124, the prompt 126, and the masks. In this example, the edited digital image 118 depicts the dog of the source digital image 122 with a tail from the prompt 126 and the object level mask 304 having texture of the reference digital image 124, indicated by the object level mask 304 for the reference digital image 124 and the part level mask 302 of the tail.

Figure 4:
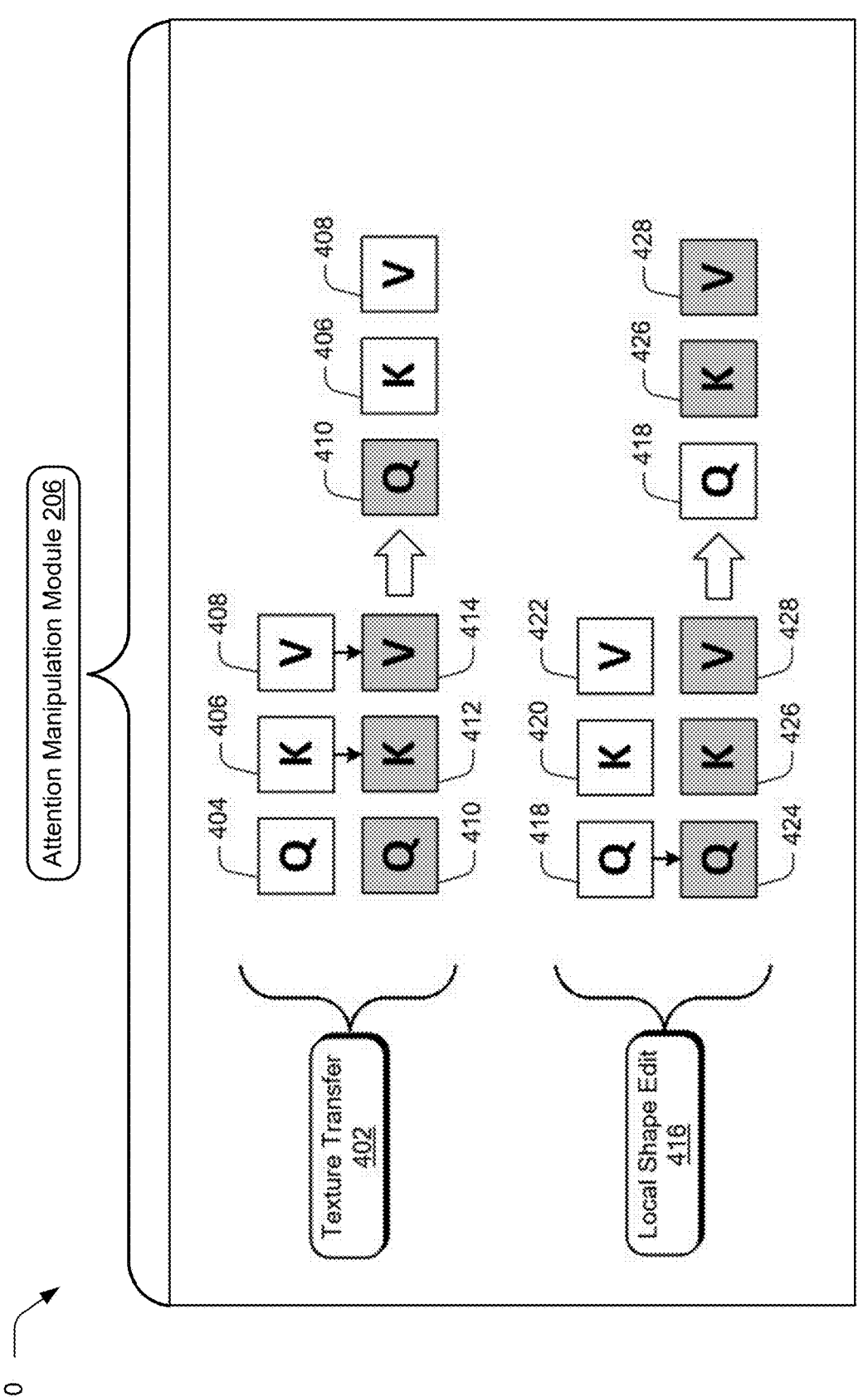
FIG. 4 depicts an example of an attention manipulation module.

FIG. 4 depicts an example 400 of an attention manipulation module 206. The attention manipulation module 206 determines attention weights 208 from the input 120 that indicate which features of the reference digital image 124 to incorporate into the source digital image 122 to form the edited digital image 118 and which features of the source digital image 122 to retain in the edited digital image 118. The attention manipulation module 206 does this by using the diffusion model 204 to replace vectors indicating features of the source digital image 122 and the reference digital image 124.

The input sequence of the self-attention of the diffusion model 204 is transformed into three vectors: Query ("Q"), Key ("K"), and Value ("V") vectors. The Q vector relates to shape, while the K vector and the V vector relate to texture.

The diffusion model 204 performs attention manipulation for both self-attention and cross-attention. In examples involving a prompt, the diffusion model 204 is text-guided and includes a contrastive language-image pretraining (CLIP) text encoder model and a Uniform Neural Network (U-Net) module or other convolutional neural network for predicting noise. The CLIP text encoder model is a type of artificial intelligence model designed to understand and generate both text and images in a coherent manner and is pre-trained on pairs of text and images to capture semantic similarity between the pairs of text and images. The U-Net includes a series of residual block containing a self-attention module and a cross-attention module. The attention mechanism of the attention modules is described as follows:

$$\text{Attention}(Q, K, V) = \text{Softmax}\left(\frac{QK^T}{\sqrt{d}}\right)V,$$

where Q represents the query features embedded from spatial features, and K and V are the key and value features embedded from the spatial features for the self-attention module. The K and V are embedded from text embeddings for cross-attention modules, and $$A = \text{Softmax}\left(\frac{QK^T}{\sqrt{d}}\right)$$

is denoted for attention maps to apply the masks from the input.

The diffusion model 204 performs two types of attention manipulation, including a texture transfer 402 and a local shape edit 416. To transfer a texture from the reference digital image 124 to the source digital image 122, the diffusion model 204 performs the texture transfer 402 by replacing the K vector and the V vector of the source digital image 122 with the K vector and the V vector of the reference digital image 124, respectively. To edit a local portion of the source digital image 122, the diffusion model 204 replaces the Q vector of the source digital image 122. To enable different signals, the diffusion model 204 applies different masks for A, as follows:

$$A^* = \sum A_i * m_i + A_{-1} * \left(1 - \sum m_i\right),$$

where $A^*$ is used to perform the next calculation with V, and $A_i$ denotes the A from i-th row and $A_{-1}$ is from the bottom row.

To perform the texture transfer 402, the diffusion model 204, receives a reference Q vector 404, a reference K vector 406, a reference V vector 408, a source Q vector 410, a source K vector 412, and a source V vector 414. The diffusion model 204 replaces the source K vector 412 with the reference K vector 406 and replaces the source V vector 414 with the reference V vector 408. This replaces the texture of the source digital image 122 with the texture of the reference digital image 124.

To perform the local shape edit 416, the diffusion model 204 receives a reference Q vector 418, a reference K vector 420, a reference V vector 422, a source Q vector 424, a source K vector 426, and a source V vector 428. The diffusion model 204 replaces the source Q vector 424 with the reference Q vector 418. This incorporates a shape of the reference digital image 124 into the source digital image 122.

Because local edits involve a specific region of the source digital image 122, the diffusion model 204 compares the feature of the portion of the reference digital image 124 to features of the source digital image 122. To do this, the diffusion model is trained to identify a region of the source digital image 122 that corresponds to the portion of the reference digital image 124. For example, because the Q vector relates to shape, the local shape edit involves identifying a corresponding region of the source digital image 122 that produces an aesthetically-pleasing or realistic shape edit. For an edit involving the Q vector, the diffusion model 204 is trained on training data of shapes of related objects or animals, depending on the source digital image 122 and the reference digital image 124. For example, the diffusion model 204 determines to apply a lion's mane from a reference digital image 124 of a lion to a region around a housecat's face by comparing the location of the lion's man in the reference digital image 124 to candidate regions of the source digital image 122 based on training data of similar digital images. In contrast, because the K vector and the V vector relate to texture, the local shape edit involves identifying a corresponding region of the source digital image 122 that produces an aesthetically-pleasing or realistic texture edit. For an edit involving the K vector or the V vector, the diffusion model 204 is trained on training data of textures of related objects or animals, depending on the source digital image 122 and the reference digital image 124. For example, the diffusion model 204 determines to apply a zebra's stripes from a reference digital image 124 of a zebra to a region flanking a horse's body by comparing the location of the zebra's stripes in the reference digital image 124 to candidate regions of the source digital image 122 based on training data of similar digital images.

Figure 5:
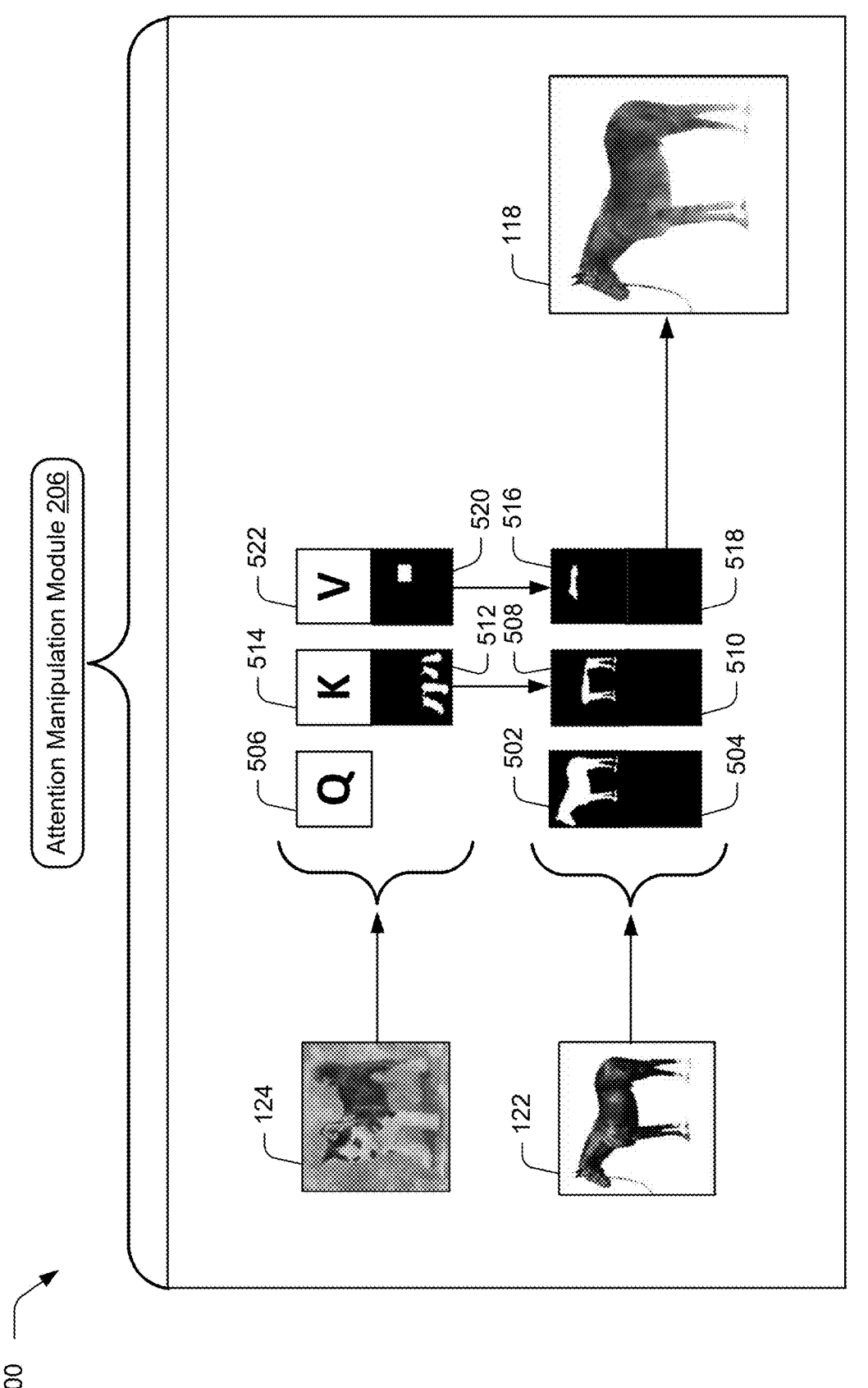
FIG. 5 depicts an example of the image combination module generating an edited digital image based on part level attention manipulation.

FIG. 5 depicts an example 500 of the image combination module 116 generating an edited digital image 118 based on part level attention manipulation.

To begin in this example, an attention manipulation module 206 of the image combination module 116 receives a source digital image 122 and a reference digital image 124. The source digital image 122 depicts a horse, and the reference digital image 124 depicts a dog with a dark body and white legs. An edited digital image 118 is desired that depicts the horse from the source digital image 122 with texture features extracted from the dog from the reference digital image 124. Because the dog depicted in the reference digital image 124 features multiple textures, the attention manipulation module 206 receives masks identifying which textures from the dog to apply to specific portions of the horse depicted in the source digital image 122.

For example, the attention manipulation module 206 receives a source object level mask 502. Because the source object level mask 502 is associated with a source Q vector 504, the source object level mask 502 indicates a shape of the horse from the source digital image 122 to incorporate into the edited digital image 118. In this example, the attention manipulation module 206 does not receive a reference object level mask that is associated with a reference Q vector 506, indicating that the edited digital image 118 does not include a shape from the dog from the reference digital image 124.

The attention manipulation module 206 also receives a source part level mask 508 outlining legs of the horse. Because the source part level mask 508 is associated with a source K vector 510, the source part level mask 508 indicates a portion of the horse to receive a texture from the reference digital image 124, meaning the legs of the horse receive the texture of from the reference digital image 124. To determine which texture of the reference digital image 124 to incorporate into the legs of the horse, however, the attention manipulation module 206 also receives a reference part level mask 512 outlining legs of the dog. Because the reference part level mask 512 is associated with the reference K vector 514, the reference part level mask 512 indicates a portion of the reference digital image 124 to extract a texture, meaning the texture of the white legs of the dog is extracted for incorporation into the legs of the horse in the source digital image 122.

The attention manipulation module 206 also receives an additional source part level mask 516 outlining a portion of the back of the horse. Because the additional source part level mask 516 is associated with a source V vector 518, the additional source part level mask 516 indicates a portion of the horse to receive a texture from the reference digital image 124, meaning the back of the horse receives the texture of from the reference digital image 124. To determine which texture of the reference digital image 124 to incorporate into the back of the horse, however, the attention manipulation module 206 also receives an additional reference part level mask 520 outlining a square of the dark body of the dog. Because the additional reference part level mask 520 is associated with the reference V vector 522, the additional reference part level mask 520 indicates a portion of the reference digital image 124 to extract a texture, meaning the texture of the dark body of the dog is extracted for incorporation into the back of the horse in the source digital image 122.

The attention manipulation module 206 then leverages the diffusion model 204 to replace the source K vector 510 and the source V vector 518 of the source digital image 122 with the reference K vector 514 and the reference V vector 522 of the reference digital image 124, respectively. Accordingly, the attention manipulation module 206 generates an edited digital image 118 depicting the horse of the source digital image 122 with the white legs and the dark body of the dog in the reference digital image 124.

Figure 6:
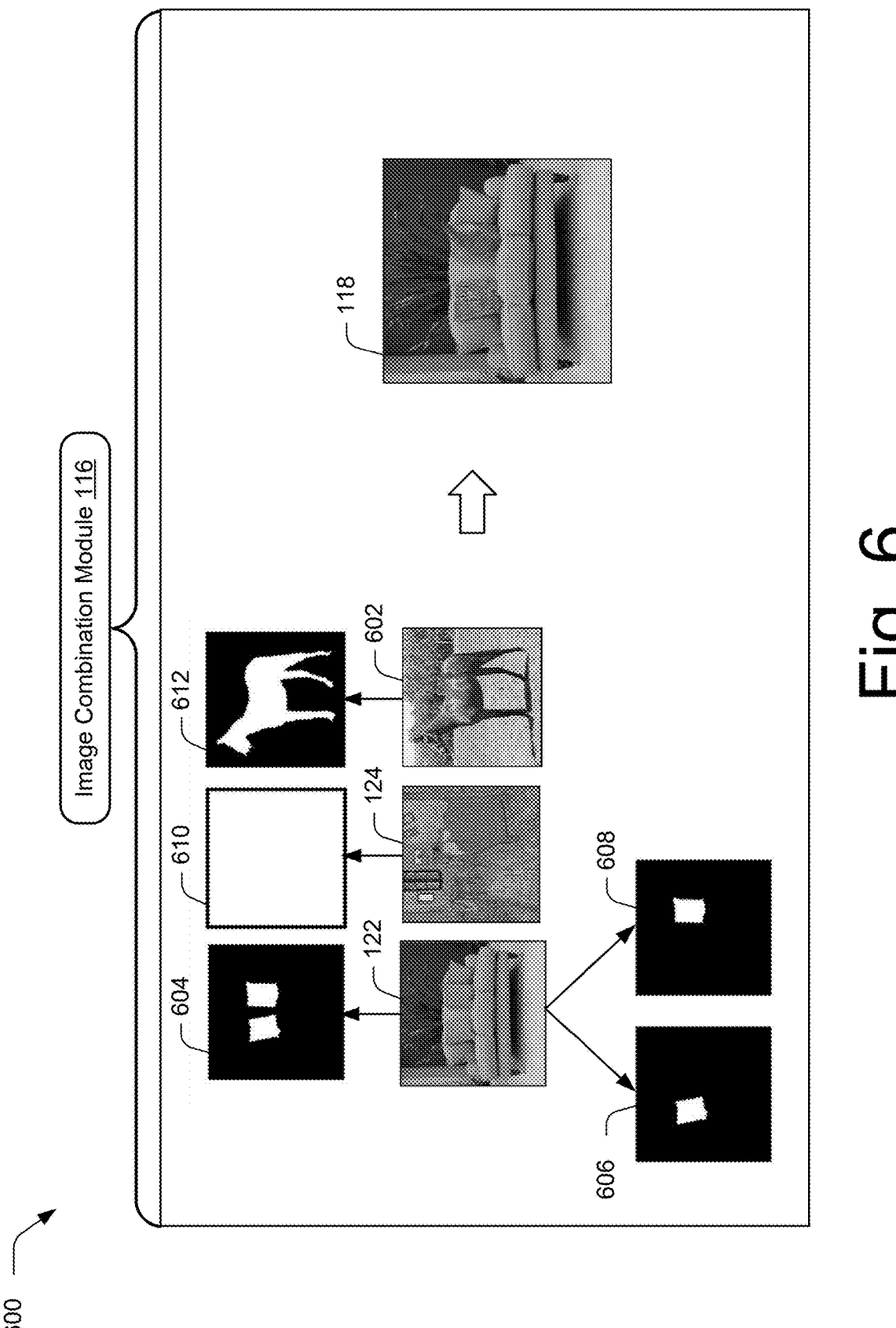
FIG. 6 depicts an example of the image combination module generating an edited digital image based on multiple reference images.

FIG. 6 depicts an example 600 of the image combination module 116 generating an edited digital image 118 based on multiple reference images. To begin in this example, the image combination module 116 receives a source digital image 122, a reference digital image 124, and an additional reference digital image 602. The source digital image 122 depicts a sofa with pillows, the reference digital image 124 depicts a painting, and the additional reference digital image 602 depicts a horse.

In this example, an edited digital image 118 is desired that depicts the sofa of the source digital image 122 with pillows that feature texture from the painting in the reference digital image 124 and the horse in the additional reference digital image 602. To determine which portion of the source digital image 122 to incorporate with the texture of the reference digital image 124 and the additional reference digital image 602, the image combination module 116 receives a source part level mask 604 outlining two pillows of the sofa in the source digital image 122. Therefore, the two pillows are to receive the texture.

Additionally, in this example, the two pillows of the sofa are desired to have different textures extracted from different reference images. For this reason, the image combination module 116 receives a mask outlining a left pillow 606 and a mask outlining the right pillow 608. Therefore, the left pillow 606 and the right pillow 608 are separated to receive different textures from the reference digital image 124 and the additional reference digital image 602.

To determine which portion of the reference digital image 124 to extract texture to incorporate into the pillows of the source digital image 122, the image combination module 116 also receives a reference object level mask 610 indicating the whole painting of the reference digital image 124. Therefore, a pillow of the source digital image 122 is to receive the texture of the entire painting of the reference digital image 124. Specifically, the texture of the reference digital image 124 is incorporated into the left pillow 606.

To determine which portion of the additional reference digital image 602 to extract texture to incorporate into the pillows of the source digital image 122, the image combination module 116 also receives an additional reference object level mask 612 indicating the whole horse of the additional reference digital image 602. Therefore, a pillow of the source digital image 122 is to receive the texture of the entire horse of the additional reference digital image 602. Specifically, the texture of the additional reference digital image 602 is incorporated into the right pillow 608.

The image combination module 116 then leverages the diffusion model 204 to replace the texture of the left pillow 606 with the texture of the reference digital image 124 and the texture of the right pillow 608 with the texture of the additional reference digital image 602. Accordingly, the image combination module 116 generates an edited digital image 118 depicting the sofa of the source digital image 122, with the left pillow 606 having the texture of the painting depicted in the reference digital image 124 and the right pillow 608 having the texture of the horse depicted in the additional reference digital image 602.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-10.

FIG. 7 depicts a procedure 700 in an example implementation of editing digital images based on masks. At block 702, a first digital image, a second digital image, a prompt 126 describing an edit to the first digital image, and a mask 128 identifying a portion of the second digital image are received. The prompt 126 describes a visual feature of an object depicted in an edited digital image 118. Some examples further comprise leveraging a co-segmentation model to generate the mask 128.

At block 704, a feature of the portion of the second digital image identified by the mask 128 is determined to incorporate into a region of the first digital image based on the prompt 126 using a machine learning model. In some examples, the feature of the portion of the second digital image is a texture depicted in the second digital image. Additionally or alternatively, the feature of the portion of the second digital image is a shape depicted in the second digital image. In some examples, the machine learning model is a diffusion model 204 that applies attentions to vectors describing features of the first digital image and the second digital image. Some examples further comprise receiving an additional digital image and determining the feature of the portion of the second digital image or the additional digital image to incorporate into the first digital image based on the attentions applied by the diffusion model 204. Additionally or alternatively, the machine learning model is a diffusion model 204 that includes a contrastive language-image pre-training (CLIP) model and a convolutional neural network.

At block 706, the region of the first digital image is identified, using a machine learning model, to incorporate the portion of the second digital image into based on the feature of the portion of the second digital image. At block 708, the edited digital image 118 is generated based on the edit described by the prompt 126, including the feature of the portion of the second digital image incorporated into the region of the first digital image. In some examples, the diffusion model 204 generates the edited digital image 118 by predicting noise for incorporation into the first digital image based on the mask 128. At block 710, the edited digital image 118 is presented in a user interface 110.

FIG. 8 depicts a procedure 800 in an additional example implementation of editing digital images based on masks. At block 802, a first digital image, a second digital image, and a mask 1128 identifying a portion of the second digital image are received.

At block 804, a feature of the portion of the second digital image is determined to incorporate into a region of the first digital image based on the mask 128 using a machine learning model. In some examples, the feature of the portion of the second digital image is a texture depicted in the second digital image. Additionally or alternatively, the feature of the portion of the second digital image is a shape depicted in the second digital image. In some examples, the machine learning model is a diffusion model 204 that applies attentions to vectors describing features of the first digital image and the second digital image. Some examples further comprise receiving an additional digital image and determining the feature of the portion of the second digital image or the additional digital image to incorporate into the first digital image based on the attentions applied by the diffusion model 204. Additionally or alternatively, the machine learning model is a diffusion model 204 that includes a contrastive language-image pretraining (CLIP) model and a convolutional neural network.

At block 806, the region of the first digital image is identified, using a machine learning model, to incorporate the portion of the second digital image into based on the feature of the portion of the second digital image. At block 808, an edited digital image 118 is generated by incorporating the feature of the portion of the second digital image into the region of the first digital image. For example, the diffusion model 204 generates the edited digital image by predicting noise for incorporation into the first digital image based on the mask 128. At block 810, the edited digital image 118 is presented in a user interface 110.

FIG. 9 depicts a procedure 900 in an additional example implementation of editing digital images based on masks. At block 902, a first digital image, a second digital image, and a mask 128 identifying a portion of the first digital image are received.

At block 904, a feature of the portion of the first digital image is identified based on the mask 128 using a machine learning model. In some examples, the machine learning model is a diffusion model 204 that applies attentions to vectors describing features of the first digital image and the second digital image. Additionally or alternatively, the machine learning model is a diffusion model 204 that includes a contrastive language-image pretraining (CLIP) model and a convolutional neural network. Some examples further comprise receiving a prompt 126 that is a description of an edited digital image 118 that guides the machine learning model.

At 906, a feature of the portion of the second digital image is determined to combine with the feature of the portion of the first digital image based on the feature of the portion of the first digital image. At block 908, the edited digital image 118 is generated by combining the feature of the portion of the second digital image with the feature of the portion of the first digital image identified by the mask 128. At block 910, the edited digital image 118 is presented in a user interface 110.

Example System and Device

Figure 10:
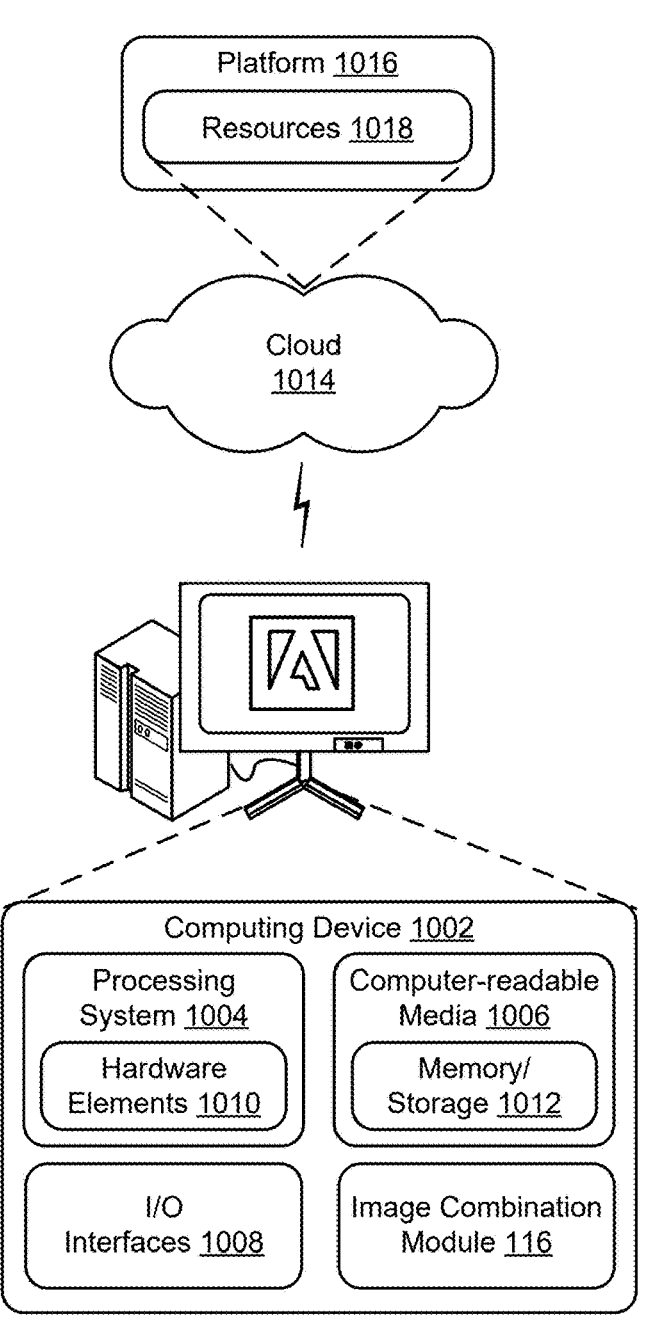
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the image combination module 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices and/or processing systems 1004) to implement techniques, modules, and examples described herein.

The techniques described herein are supported by various configurations of the computing device 1002 and are not limited to the specific examples of the techniques described herein. This functionality is also implementable through use of a distributed system, such as over a "cloud" 1114 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized when computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

What is claimed is:

1. A method comprising:

receiving, by a processing device, a first digital image, a second digital image, a prompt describing an edit to the first digital image, and a mask identifying a feature of the second digital image;

determining, by the processing device using a machine learning model, vectors corresponding to the feature of the second digital image identified by the mask to replace vectors corresponding to of the first digital image based on the prompt, the prompt specifying the feature as at least one of a texture or a shape;

identifying, by the processing device using the machine learning model, a region of the first digital image to incorporate the feature of the second digital image into based on the vectors corresponding to the feature of the second digital image and the vectors corresponding to the first digital image;

generating, by the processing device, an edited digital image based on the edit described by the prompt, including the at least one of the texture or the shape from the feature of the second digital image incorporated into the region of the first digital image; and presenting, by the processing device, the edited digital image in a user interface.

2. The method of claim 1, wherein the prompt describes a visual feature of an object depicted in the edited digital image.

3. The method of claim 1, wherein the texture is depicted in the second digital image.

4. The method of claim 1, wherein the shape is a portion of an object depicted in the second digital image.

5. The method of claim 1, wherein the machine learning model is a diffusion model that applies attentions to vectors describing features of the first digital image and the second digital image, including vectors describing the region of the first digital image to incorporate the feature of the second digital image into based on the feature of the second digital image.

6. The method of claim 5, wherein the vectors describing the features of the first digital image are determined based on an additional mask indicating the region of the first digital image.

7. The method of claim 5, further comprising determining the vectors describing the features of the first digital image by comparing the feature of the second digital image to features of the first digital image using the diffusion model.

8. The method of claim 5, further comprising receiving an additional digital image and determining the feature of the second digital image or the additional digital image to incorporate into the first digital image based on the attentions applied by the diffusion model.

9. The method of claim 1, wherein the machine learning model is a diffusion model that includes a contrastive language-image pretraining (CLIP) model and a convolutional neural network that generates the edited digital image by predicting noise for incorporation into the first digital image based on the mask.

10. The method of claim 1, further comprising receiving an additional mask identifying the region of the first digital image.

11. A system comprising:

a memory component; and a processing device coupled to the memory component, the processing device to perform operations comprising:

receiving a first digital image, a second digital image, a prompt describing an edit to the first digital image, and a mask identifying a feature of the second digital image;

determining, using a machine learning model, vectors corresponding to the feature of the second digital image to replace vectors corresponding to the first digital image based on the mask and the prompt specifying the feature as at least one of a texture or a shape;

identifying, using the machine learning model, a region of the first digital image to incorporate the feature of the second digital image into based on the vectors corresponding to the feature of the second digital image and the vectors corresponding to the first digital image;

generating an edited digital image by incorporating the feature of the second digital image into the region of the first digital image; and presenting the edited digital image in a user interface.

12. The system of claim 11, wherein the texture is depicted in the second digital image.

13. The system of claim 11, wherein the shape is a portion of an object depicted in the second digital image.

14. The system of claim 11, wherein the machine learning model is a diffusion model that applies attentions to vectors describing features of the first digital image and the second digital image.

15. The system of claim 14, further comprising receiving an additional digital image and determining the feature of the second digital image or the additional digital image to incorporate into the first digital image based on the attentions applied by the diffusion model.

16. The system of claim 11, wherein the machine learning model is a diffusion model that includes a contrastive language-image pretraining (CLIP) model and a convolutional neural network.

17. A non-transitory computer-readable storage medium storing executable instructions, which when executed by a processing device, cause the processing device to perform operations comprising:

receiving a first digital image, a second digital image, a prompt describing an edit to the first digital image, and a mask identifying a feature of the first digital image;

determining, using a machine learning model, vectors corresponding to the feature of the first digital image identified by the mask to be replaced by vectors corresponding to the second digital image based on the prompt, the prompt specifying the feature as at least one of a texture or a shape;

identifying, using the machine learning model, a region of the second digital image to incorporate into the second digital image into based on the vectors corresponding to the feature of the first digital image and the vectors corresponding to the second digital image;

generating an edited digital image based on the edit described by the prompt, including the at least one of the texture or the shape from the feature of the first digital image replaced with content based on the region of the second digital image; and presenting the edited digital image in a user interface.

18. The non-transitory computer-readable storage medium of claim 17, further comprising receiving a prompt that is a description of the edited digital image that guides the machine learning model.

19. The non-transitory computer-readable storage medium of claim 17, wherein the machine learning model is a diffusion model that applies attentions to vectors describing features of the first digital image and the second digital image.

20. The non-transitory computer-readable storage medium of claim 17, wherein the machine learning model is a diffusion model that includes a contrastive language-image pretraining (CLIP) model and a convolutional neural network.

* * * * *